United States Patent [19]

Drescher et al.

[11] Patent Number: 4,951,136
[45] Date of Patent: Aug. 21, 1990

[54] METHOD AND APPARATUS FOR REMOTE RECONNAISSANCE OF THE EARTH

[75] Inventors: Armin Drescher, Munich; Burkhard Braumer, Neuried bei Munchen, both of Fed. Rep. of Germany

[73] Assignees: Deutsche Forschungs- und Versuchsanstalt fur Luft- und Raumfahrt e.V., Cologne; Ingenieurburo Burkhard Braumer, Neuried bei Munchen, both of Fed. Rep. of Germany

[21] Appl. No.: 301,092

[22] Filed: Jan. 25, 1989

[30] Foreign Application Priority Data

Jan. 26, 1988 [DE] Fed. Rep. of Germany ....... 3802219

[51] Int. Cl.$^5$ .......................... H04N 3/15; H04N 7/18
[52] U.S. Cl. ...................................... 358/109; 358/88; 358/213.27
[58] Field of Search ...................... 358/109, 88, 213.27

[56] References Cited

U.S. PATENT DOCUMENTS 4,689,748 8/1987 Hofmann ............................ 358/109
4,742,396 5/1988 Bell .................................. 358/213.25
4,747,155 5/1988 Dotson ................................ 358/109

Primary Examiner—Howard W. Britton
Attorney, Agent, or Firm—Browdy and Neimark.

[57] ABSTRACT

For remote aerial or satellite reconnaissance of the earth using an optoelectronic camera that takes area photographs and has one or more line scanners associated with it, or a combination of such cameras, a series of overlapping individual pictures is taken at regular intervals. In the overlapping zone of adjacent individual area pictures, the positions of corresponding pixels or picture zones, so-called partial images, are then selected for mutual orientation of the photographing positions of the area camera or cameras. Finally, the orientation data from the optoelectronic area camera or cameras are transmitted to the line scanner by fixed orientation or measurement of the relative orientation.

12 Claims, 3 Drawing Sheets

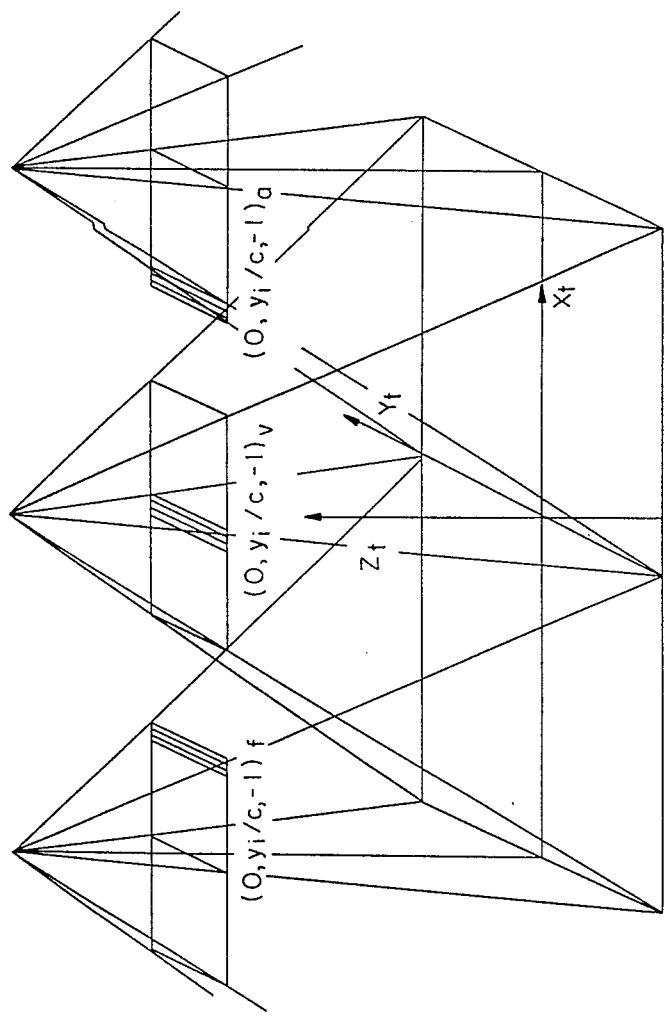

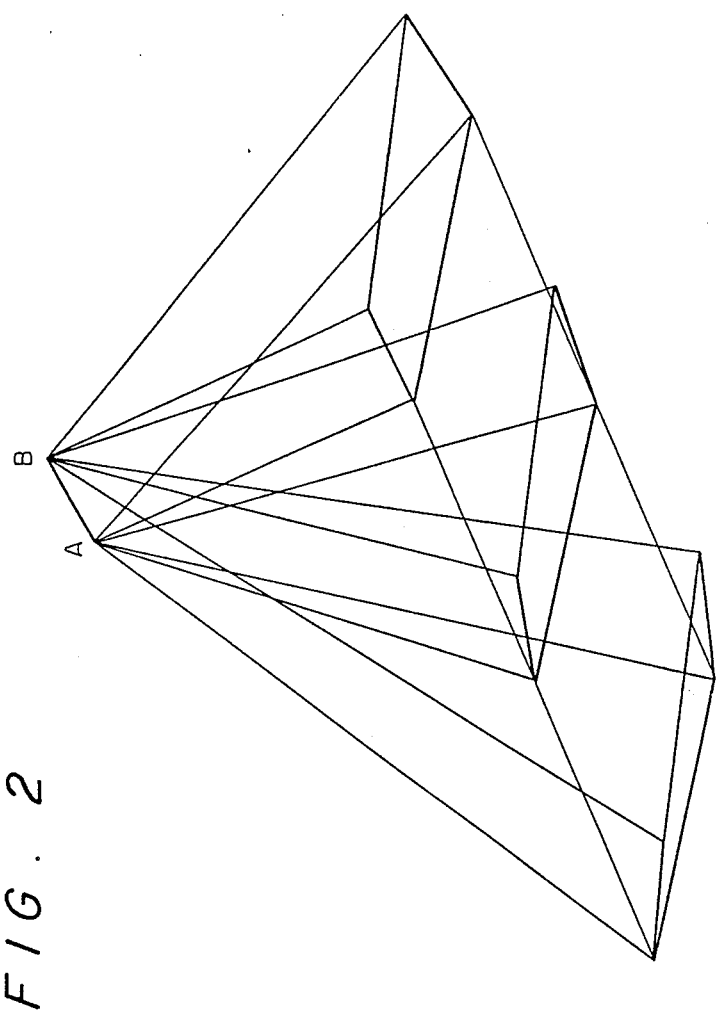

METHOD AND APPARATUS FOR REMOTE RECONNAISSANCE OF THE EARTH

FIELD OF THE INVENTION

The invention relates to a method and apparatus for remote reconnaissance of the earth by using line scanners.

BACKGROUND OF THE INVENTION

For remote reconnaissance of the earth from satellites in the optical spectral range, optoelectronic line scanners are predominantly used. Either a line is scanned mechanically by a rotating mirror, or a single image line is simultaneously picked up by charge-coupled devices or CCD units. The cameras of the French Spot satellite and of the IRS satellite (Indian Remote Sensing Satellite) are examples. CCD line scanners for use with the shuttle or for a satellite include the (stereoscopic) modular optoelectronic multispectral scanner (MOMS or stereo MOMS), made by MBB, and the MEOSS scanners (for monocular electrooptical stereo scanner), made by the present assignee.

In all line scanners used thus far, the forward motion of the camera carrier, that is, the satellite or aircraft, produces the image from individual lines. The resultant continuous image strips are therefore not geometrically rigid. They are distorted by the dynamics of the carrier, and positional fluctuations and deviations from the ideal, straight-line forward motion are sources of error. For this reason, the geometric quality of the images obtained by means of line scanners is by no means satisfactory.

The image distortions can be detected only by a comparison with error-free images and maps, or with real positions of prominent landmarks on the surface of the earth. This requires a large number of comparison points, and their density must be adapted to the amplitudes and frequencies of the image disturbances.

If cameras that photograph two-dimensionally are used, the pictures taken with such cameras are two-dimensionally rigid, because the entire image area is photographed simultaneously. In that case, an overlapping pair of photographs can be looked at stereoscopically and evaluated accordingly. In this way, not only is a dimensionally stable copy (a so-called model) of the photographed surface obtained, but at the same time the location and angular orientation of the two still cameras relative to the surface that is copied are ascertained as well.

For the last-mentioned purpose, the image positions of four points, not located on a single line, in the overlapping zone of the pair of pictures taken by the two cameras are sufficient. This is known as the "self-orientation capacity" of such still cameras. A prerequisite is that the invariable copying properties of the camera be accurately known.

The self-orientation capacity of still cameras is utilized in aerial mapping to produce large coherent composite images from overlapping single photographs. By using four comparison points per overlapping zone at a time, all the images can be oriented relative to one another, and all the cameras can be oriented relative to the actual earth surface, with a single uniform scale. This is known as "model resolution" in "photogrammetric block balancing".

For a "model resolution" of this kind, it is sufficient to compare the positions of identical image points in the image space (that is, on the individual photographs). The true, actual image coordinates of these points are not needed for forming the model. However, the ground coordinates of only four points (for instance in the corners of a block) are sufficient to ascertain the location and scale of the ideal surface from the model (that is, from the block).

For orienting line scanners with respect to the earth's surface, still cameras are sometimes used parallel with the line scanners in aircraft. Problems then arise, however, because both digital and analog (photographic) data need to be processed further, and not only must the image data be temporally associated with one another, but the picture repetition frequency for the photographs taken must be high, so that the high-frequency carrier dynamics resulting, for instance, from jarring, natural oscillation, and the like can be detected.

In video cameras equipped with CCD area sensors and so far generally intended for use by amateurs, the area sensors typically have 250×500 pixels (columns and lines). Remote reconnaissance and mapping of the earth, however, requires cameras having approximately 10,000×10,000 pixels, yet the production of malfunction-free, homogeneous area detectors of this order of magnitude in the foreseeable future is impossible. Attempts have therefore been made to produce image areas having the required number of pixels by means of a mosaic arrangement of smaller CCD area detectors.

For technical reasons, especially the number of supply lines and the need to carry signals, a gap-free mosaic arrangement of this kind is impossible. To cover the gaps, at least one further parallel-oriented camera with a suitably offset mosaic must therefore be used.

The primary problem with large-area optoelectronic cameras, however, is in data transmission. To keep the transmission rate constant, the entire image content must be stored in memory until the next photograph is taken. Thus far, the only possible memories for this purpose were the CCD units themselves, but these units have relatively high electronic noise and dark currents, so that the picture quality suffers from the long memory storage times (of up to one minute). This kind of arrangement of optoelectronic solid-state sensor areas in photogrammetric copying systems is described in German patent 34 28 325, for example.

The overlapping pictures taken with area cameras enable stereoscopic viewing and surveying of the terrain, as well as the above-described model formation by block balancing for large composite images, and for this reason are preferred in topographic mapping.

Multispectral or panchromatic line scanners, however, are used to a substantially greater extent and therefore substantially more widely; their true- or false-color images allow thematic classification of the surface (for example by types of vegetation or soil). In that case, though, the view direction must be as uniform and as parallel to the sun as possible; otherwise the color relationships are shade-dependent or in other words have a bluish cast.

The fact that in area cameras the view direction also varies with the direction of flight has also led to a clear preference for line scanners for multispectral mapping. For this reason, CCD area sensors for multispectral photographs are also preferentially used in prism or grating spectrometers. Here, only one line on the earth's surface is photographed at a time, that is, in one exposure. This single line, however, is spectrally decomposed by a prism or a grating, so that the spectral information is distributed onto the area CCD. This means that each line of the area detector sees a different "color" of the same line on the ground.

In terms of the development of optoelectronic line scanners with stereoscopic capacity, a number of proposals for making this type of equipment usable for topographic mapping as well have already been published. Examples include the cameras for a project equipped with MBB stereo MOMS and the MEOSS Project, thus far the only one carried out, of the present assignee.

For stereoscopic pictures, at least two planes inclined relative to one another must be used. This can be done by tilting complete line scanners, for instance with stereo MOMS, or by using parallel CCD line detectors in the image plane of optical equipment, as in the case of the MOESS Project. To enable mutual orientation, or in other words a model self-orientation like that in photogrammetric block formation from area photographs, however, at least three scanning planes must be used; this is schematically illustrated in FIG. 1.

A single image in this case comprises three lines, exposed at the same time, which are are spaced apart by a socalled "basic length" B. An instantaneous image of this kind is called a "line triplet". Under ideal flying conditions, that is, a constant height and speed, with the camera oriented parallel to the ground, and so forth, the individual pictures, i.e., the line triplets, each spaced apart by the basic length B, then overlap. In an ideal case such as this, four (or usually, more than four) common points are then located on each of two lines of both line triplets, and these points make it possible to ascertain the mutual "ideal orientation" of the triplets to one another.

Generally, however, four common points for two line triplets cannot be found, because the pixels of one line triplet, spaced apart by the basic length B, are distributed over a certain zone known as a coherent segment of a plurality of line triplets. As a result, it is no longer possible to orient the line triplets relative to one another in a mathematically univocal way.

Adjacent line triplets can, however, be combined into so-called "segment triplets". In that case, then four or more common pixels can always be found for a mutual orientation of the segment triplets spaced apart by the basic length B.

Since segment triplets are formed from line triplets that are exposed in chronological succession, however, they themselves are already distorted from fluctuations in the path and location of the camera carrier, i.e., the aircraft or satellite. Then they are no longer located in the same common image plane, such as that shown schematically in FIG. 2, and despite the presence of four common pixels, they can no longer be mathematically univocally oriented to one another.

To arrive at acceptable approximations that are acceptable for practical use, various interpolation models have been used. In its MEOSS Project, for instance, the present assignee developed and used satellite-specific theoretical models of the path and location dynamics as interpolation models.

Nevertheless, the methods and apparatus used thus far have various disadvantages. In the optoelectronic area cameras, it is disadvantageous that different view directions develop in the flight direction; that many individual area detectors must be adjusted for a large mosaic; that two or more parallel-oriented optical systems, i.e., cameras, must be used; and that the contents of a complete image must be stored in buffer memory for a relatively long period of time.

In orientation with stereoscopic three-line scanners, it is disadvantageous that interpolation models are required; that software developed for photogrammetric purposes must be expanded for block balancing; that the line scanners are sensitive to high frequency carrier dynamics; that long image strips are required, or else the area being photographed must be flown over in a zigzag pattern; and finally, that if the individual lines are canted relative to one another, the height resolution in stereoscopic evaluation is not constant.

SUMMARY OF THE INVENTION

The invention therefore proposes a method for remote reconnaissance of the earth, and an apparatus for performing it, which no longer has the above disadvantages of the methods and apparatus heretofore developed and used, and in which the use of preferably multispectral or panchromatic line scanners eliminates the problems, especially in terms of geometry, that had arisen previously.

According to the present invention, this object is attained by a method for remote reconnaissance of the earth using line scanners, wherein at least one optoelectronic camera takes area photographs and is associated with at least one line scanner. A series of overlapping individual pictures is taken at regular time intervals, and the positions of corresponding pixels or picture zones in the overlapping zone of adjacent individual area pictures are then selected for mutual orientation of the photographic positions of the area camera. The orientation data from the optoelectronic area camera are transmitted to the line scanners by fixed orientation or measurement of the relative orientation, reinforced by a chronological association of both data streams.

The partial images may be spaced apart from one another by the largest possible angle in order to obtain high accuracy of the mutual orientation.

For the orientation of relatively large composites of line scanner photographs, the area photographs are used in the manner of a photogrammetric block balancing.

Alternatively, the line scanner on the picture composite made up of area pictures can be orientable continuously by means of image correlation.

The orientation capacity of the area camera can be used for positional and path regulation of the camera carrier. This enables one to obtain an image overlap for line scanners, the scanning lines of which are offset in the focal plane.

In the process according to the present invention, overlapping individual pictures can be produced in accordance with the instant of exposure. The position of the sensor faces activated in the camera is controlled as a function of path and positional information of the camera carrier.

The optoelectronic camera taking area pictures may be fixedly associated with the line scanner(s).

In the apparatus according to the present invention, an optoelectronic camera taking area pictures is associated with the line scanner or scanners in a variable association determined by additional measurements of spacings and angles.

In a preferred embodiment, three CCD line detectors (CCD1–CCD3) serving as line scanners are disposed, oriented in parallel with one another, in the focal plane of a common lens of the optoelectronic camera. Additional area detectors (FD1–FD4) are disposed in the focal plane between the three CCD line detectors. In another embodiment, the area detectors are exposable via the common camera lens and via mirrors or beam splitters. In yet another embodiment, the additional area detectors are partially shaded, so that they can be used as image memories.

According to the invention, one or more line scanners are associated with an optoelectronic camera taking area pictures, or a combination of such cameras. Block balancing or the self-orientation capacity for the line scanner or scanners is attained by overlapping single exposures of an area taken by the camera.

Also for block balancing or the self-orientation capacity, sensitive zones, in the form of partial area images in the overlapping zone of adjoining single exposures, inside the camera are used; the data of these zones are then required for block formation. As a result, there is no necessity whatever for evaluation of the entire image content of each individual exposure. Instead, the data of four partial images, for instance, that in the overlapping zone are spaced apart by the greatest possible angular distance from one another in the focal plane of the camera are sufficient. The minimum size of these partial images depends on what is required in terms of digital image correlation.

Transmission, or in other words an association of the orientation data from the area 2-D camera, to the line scanner or scanners is effected by fixed orientation or measurement of the relative orientation, and by a chronological association of the two data streams, which can be assured for instance by a common time code.

In the method according to the invention, a series of overlapping single pictures with the aid of the optoelectronic area camera is produced by making an exposure at regular time intervals. The frequency with which the single pictures are taken and the size of the "window zones", in the form of the aforementioned partial pictures, that are to be evaluated for image correlation depend substantially on the carrier dynamics and on the type of terrain to be surveyed.

By means of the image correlation, then, at least three common pixels or picture zones at a time are detected in the overlapping zone, or window zone, of a pair of pictures. The mutual orientation of a composite image can be accomplished with one of the conventional standard methods for photogrammetric block balancing.

The orientation of a line scanner, or of the line scanners, is obtained directly for all the exposure instants by means of the camera that takes area pictures. In the period of time between the individual exposures, the line scanner can then be moved relative to the area images by means of image correlation at considerably more finely defined intervals. This orientation is univocal for stereoscopic line scanners. With monoscopic scanners, however, still further interpolation models are needed for orientation.

A particularly advantageous feature of the method and apparatus according to the invention is that they are attainable by simple technology and hence can be constructed quickly, and that the required software is already available and even widely disseminated.

Furthermore, in both the method according to the invention and the apparatus for performing it, the advantages of line scanners are combined with those of area cameras in such a way that both the method and the apparatuses are largely free of the disadvantages of line scanners and area cameras.

In addition, the invention functions optoelectronically and digitally from the outset. On-board processing virtually in real time is thus attainable. Moreover, the "image navigation" method of the invention can also contribute to regulating the path and position of the carrier, in particular for the line scanner. Another advantage of the method according to the invention is that in proportion to the data stream of the line scanner or scanners, only a very slight increase in the data rate is necessary.

A preferred embodiment of the invention will now be described in detail, referring to the drawings.

BRIEF DESCRIPTION OF THE DRAWINGS

FIG. 1 is a schematic illustration of a conventional mutual orientation of two line triplets of a triple stereoscopic line scanner under ideal conditions;

FIG. 2 is an illustration of an embodiment of a nonlinear segment triplet by means of a linear interpolation between two line triplets, rotated relative to one another, as the smaller unit of a two-dimensional partial image in a continuous of a triple stereoscopic line scanner;

DESCRIPTION OF THE PREFERRED EMBODIMENT

Figure 4:
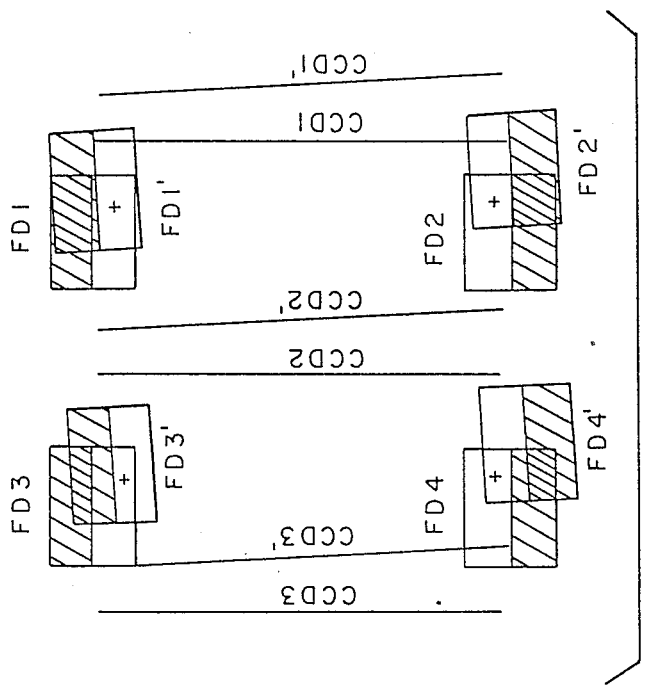
FIG. 4 is a schematic illustration of a relative displacement and orientation of two individual pictures taken successively.
Figure 3:
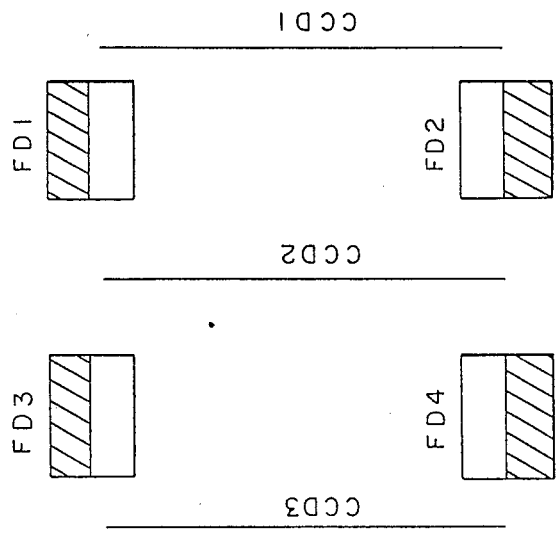
FIG. 3 is a schematic illustration of line scanners and area scanners associated with them.

FIGS. 3 and 4 show a preferred embodiment of an apparatus for performing the method according to the invention, with which a triple stereoscopic line scanner used in the aforementioned MEOSS Project by the present assignee is augmented.

Three CCD line detectors CCD1–CCD3, each having 3456 elements by way of example, are oriented parallel to one another in the focal plane of a common lens (not shown) of an area camera. Four additional area detectors FD1–FD4 in the form of a rectangle are disposed in between the three line detectors CCD1–CCD3. At least part, or in other words at least half and preferably more than half, of the four area detectors FD1–FD4 is shaded.

Each time a single picture is taken of an area, the non-shaded parts of the surface of the four area detectors FD1–FD4 are briefly and simultaneously exposed electronically. The picture contents of the individual, approximately half-shaded area detectors are immediately displaced into the shaded zones of the detectors, stored in memory there, and then read out at a constant, low data rate.

The displacements and hence the relative orientation of the next individual picture taken is effected over four comparison points, each represented in the drawing by a +, in the overlapping partial zones of the individual area detectors FD1–FD4 or FD1'FD4' (the apostrophe indicates the arrangement displaced to the right in FIG. 4 for the next individual picture).

A brief comparison of the required data rates will now be made. Assuming line and area sensors or detectors having an identical scanning range, the line frequency will be the same for both sensors. For an image correlation, a height (that is, a column number) of 20 on the associated area detector is sufficient, as compared with 3456 columns per CCD line detector.

Further assuming an overlap extent of 50% or in other words 0.5 in the flight direction for the area pictures taken, then the resultant data rates are as follows:

For the line scanner:

Three sensors each having 3456 pixels (columns times the line frequency);

For the area camera:

Four sensors having 20 columns times the line frequency/overlap extent.

The ratio of the data rates of the area camera and the line detectors thus becomes:

$$\frac{4 \times 20}{3 \times 3456 \times 0.5} = 0.0154$$

or in other words, 1.54%.

For overlapping where major positional fluctuations occur, higher column numbers can be used on the area CCDs.

The method and apparatus according to the invention can be used not only for remote aerial or satellite reconnaissance of the earth but also, advantageously, for monitoring and controlling industrial advance working processes.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

We claim:

1. A method for remote aerial or satellite reconnaissance of the earth with the aid of line scanners, comprising taking a series of overlapping and stereoscopic frame pictures at regular time intervals with at least one optoelectronic frame camera associated with at least one line scanner;

determination of the mutual orientation of the photographing positions of the frame cameras by corresponding pixels or picture zones in the overlapping zones of adjacent individual frame pictures; and transmitting orientation data from the optoelectronic frame camera to the line scanners by fixed orientation or measurement of the relative orientation, reinforced by a chronological association of both data streams.

2. The method according to claim 1 wherein the partial frame images are spaced apart from one an other by the largest possible angle in order to obtain high accuracy of the mutual orientation.

3. The method according to claim 1 wherein the frame photographs are used in the manner of a photogrammertric block adjustment in order to orient relatively large composites of frame photographs.

4. The method according to claim 1 wherein the line scanner is continuously orientable on the picture composite made of frame pictures by means of image correlation.

5. The method according to claim 1 wherein the positional and path regulation of the cammera carrier is oriented by the orientation capacity of the frame camera in order to obtain an image overlap for line scanners, the scanning lines of which are offset in the focal plane.

6. The method according to claim 1 wherein the production of overlapping individual pictures—in accordance with the instant of exposure and the position of the sensor faces activated in the camera—is controlled as a function of the path and positional information of the camera carrier.

7. An apparatus for remote aerial or satelite reconnaissance in combination an optoelectronic camera taking frame pictures fixedly associated with at least one line scanner.

8. The apparatus according to claim 7 wherein the optoelectronic camera is associated with the line scanner in a variable association determined by additional measurements of spacings and angles.

9. The apparatus according to claim 7 wherein one or several CCD line detectors serving as line scanners are disposed in the focal plane of a common lens of the optoelectronic camera, and the additional frame detectors are disposed in the same focal plane between the CCD line detectors.

10. The apparatus according to claim 7 wherein the frame detectors are exposed in the common camera via mirrors or beam splitters, to generate overlapping fields of view for the linear and the frame detectors.

11. The apparatus according to claim 7 wherein the additional area deterctos are partially shaded, so that they can be used as image memories.

12. An apparatus for remote aerial or satellite reconnaissance comprising in combination;

an optoelectronic frame camera;

means for taking a series of overlapping and stereoscopic frame pictures;

means for determination of neutral orientation of the photographing positions of the frame camera by corresponding pixels or picture zones in the overlapping zone of adjacent individual frame pictures; and means for transmitting orientation data from the optoelectric frame camera to the line scanners by fixed orientation or measurement of the relative orientation, reinforced by a chronological association of both data or streams.

* * * * *